United States Patent [19]

Kazdan et al.

[11] Patent Number: 5,122,939
[45] Date of Patent: Jun. 16, 1992

[54] SAFETY LIGHTING AND REFLECTOR SYSTEM

[76] Inventors: David Kazdan; Laura C. Gooch, both of 2475 Kingston Rd., Cleveland, Ohio 44118

[21] Appl. No.: 712,082

[22] Filed: Jun. 7, 1991

[51] Int. Cl.⁵ ............................................. F21V 13/00
[52] U.S. Cl. .................... 362/243; 362/268; 362/327; 362/800; 359/528
[58] Field of Search ............... 362/243, 244, 245, 247, 362/327, 331, 339, 800, 268; 350/97, 100, 102, 103; 359/515, 527, 528, 529

[56] References Cited

U.S. PATENT DOCUMENTS

| | | | |
|---|---|---|---|
| 1,874,138 | 8/1932 | Stimson | 362/83.1 |
| 1,878,909 | 9/1932 | Stimson | 350/102 |
| 2,012,933 | 8/1935 | Davidson . | |
| 3,741,623 | 6/1973 | Mihalik | 359/528 |
| 3,818,218 | 6/1974 | Heenan et al. . | |
| 4,423,473 | 12/1983 | Kirkley | 362/186 |
| 4,451,871 | 5/1984 | Kirkley et al. | 362/191 |
| 4,891,736 | 1/1990 | Gouda | 362/72 |
| 4,949,228 | 8/1990 | Lin et al. | 362/800 |
| 4,952,023 | 8/1990 | Bradshaw et al. | 350/102 |
| 5,015,918 | 5/1991 | Copeland | 362/72 |

FOREIGN PATENT DOCUMENTS 540799  9/1955  Belgium ........................ 362/268

Primary Examiner—Ira S. Lazarus
Assistant Examiner—D. M. Cox
Attorney, Agent, or Firm—Pearne, Gordon, McCoy & Granger

[57] ABSTRACT

A self-illuminated reflector useful as a nighttime warning marker has a retroreflective surface for redirecting external light back to its source, and includes miniature low power lamps which sufficiently illuminate the retroreflective surface to provide a highly visible warning marker in the absence of any external light directed at the surface. The self-illuminated reflector is comprised of a light source embedded within the optical material of a retroreflector which is directly coupled to a lens to provide a contiguous optical path between the retroreflector and the lens. In one embodiment, four light-emitting diodes are embedded in a three-inch diameter retroreflector which is covered by a clear, transparent lens to provide a lightweight, inexpensive warning marker.

13 Claims, 2 Drawing Sheets

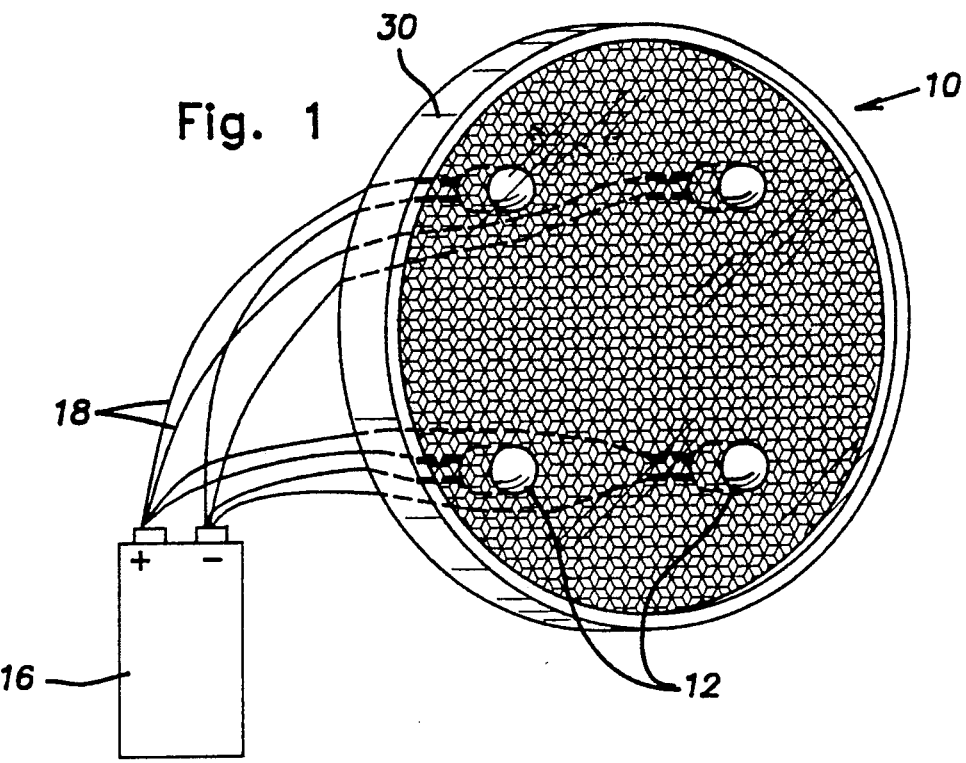

SAFETY LIGHTING AND REFLECTOR SYSTEM

BACKGROUND OF THE INVENTION

The present invention relates to a self-illuminated reflector which is suitable for use as a safety light for bicycles, boats, parked vehicles, and other applications requiring a marker which is highly visible at night.

DESCRIPTION OF RELATED ART

Various safety lighting devices incorporating reflectors have been suggested. These devices generally relate to either a lamp mounted behind a lens member having retroreflective surfaces, a lamp mounted in a concave specular reflector, or some combination thereof. Most of these devices are bulky, require a substantial power supply, or do not adequately disperse light over the reflective surface.

U.S. Pat. Nos. 4,423,473 and 4,451,871 provide a relatively lightweight, compact safety light which requires very little power. These devices, which comprise a light-emitting diode mounted behind a transparent collimating lens and to the base of a parabolic specular reflector, overcome some of the problems mentioned above. However, they do not provide a highly visible self-illuminated surface whose intensity is substantially undiminished, with viewing angles ranging from 0° up to nearly 90°.

It would be desirable to provide a small, lightweight, inexpensive, self-illuminated warning marker which is highly visible at night from a variety of viewing angles and which could be powered by a standard low power battery. It would also be desirable if the self-illuminated surface were simultaneously capable of efficiently reflecting external light back to its source.

SUMMARY OF THE INVENTION

The present invention provides a self-illuminated reflector which offers high visibility and has low power requirements. A high intensity light-emitting diode or other low power lamp is mounted on or embedded within or immediately adjacent to a member having a retroreflective back surface. The retroreflector is preferably produced from an inexpensive transparent plastic having a high refractive index to provide nearly total internal reflection at the retroreflective surfaces.

The device effectively redisperses the light from the light-generating means over a greater surface area to provide an illuminated marker which can be easily detected by operators of motor-driven vehicles and others at night regardless of the angle of the viewer to the plane of the reflector. The device also acts as a pure retroreflector to redirect external light from an angle back to its source and in particular, that from motor vehicle headlights.

The device can be produced in a variety of shapes and colors, and can be adapted for use as a vehicle marker, driveway marker, a portable warning marker for pedestrians, and other similar applications.

BRIEF DESCRIPTION OF THE DRAWINGS

FIG. 1 is a perspective view of the self-illuminating retroreflector system;

FIG. 2 is a cross-sectional side view of the retroreflector system shown in FIG. 1;

FIG. 3 is a cross-sectional side view of an alternative embodiment of the retroreflector system shown in FIG. 1, including a lens member disposed over the lamps;

DETAILED DESCRIPTION OF THE PREFERRED EMBODIMENT

Figure 4:
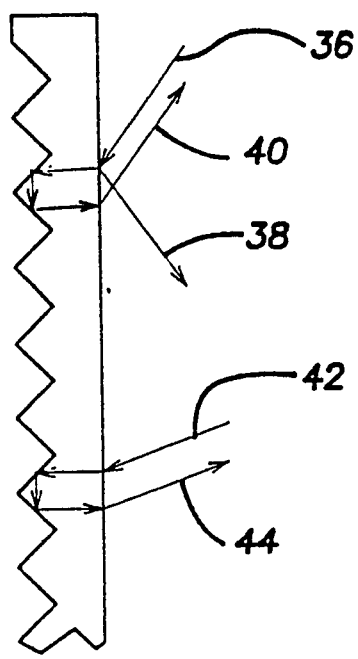
FIG. 4 is a schematic cross-sectional side view of the retroreflector system shown in FIG 1, showing the different paths which light rays take within the retroreflector for incident paths less than 45 degrees and greater than 45 degrees with respect to a path normal to the external surface of the retroreflector.

Referring to the drawings, and in particular to FIG. 1, a disc-shaped, self-illuminating, retroreflector system 10 has a light-emitting diodes 12 or other low-power, light-generating means mounted or preferably embedded within it. Electric current conducting leads 14 are connected in parallel, or in series, to a battery 16 or other source of electric current by wires 18. A plastic housing 30 is provided for supporting the retroreflector and light-emitting diodes. The housing can be glued to the retroreflector along the circumferential flange portion 29 of the housing or, as an alternative, the retroreflector can be thermally fused to the housing. The retroreflector 20 has a retroreflective surface 22 comprising an array of retroreflective cells or elements, each having three mutually perpendicular planes acting as mirrors, so that light entering the retroreflector is reflected back along the same path it was incident from or along another path which is parallel and close to the incident path. The retroreflector may be produced from any transparent solid and in a variety of colors. Molded plastic having a high refractive index is preferred because it can provide nearly total internal reflection at its junction with air, permitting it to work efficiently without requiring a silvered coating on the back surfaces. Moreover, molded plastic retroreflectors can be produced at a relatively low cost. The front or illuminated surface 24 is flat, and either smooth to provide a sharper beam of light or rough to provide a more uniformly dispersed beam.

The retroreflective surface is comprised of an array of small cells, each having three mutually perpendicular reflective faces with the edge of each cell abutting adjacent cells. A ray of light passing through the retroreflector will strike a face of one of the cells and be reflected off that face and onto at least one, or possibly both, of the other faces of the same cell before being reflected back out of the cell along a parallel path.

Figure 5:
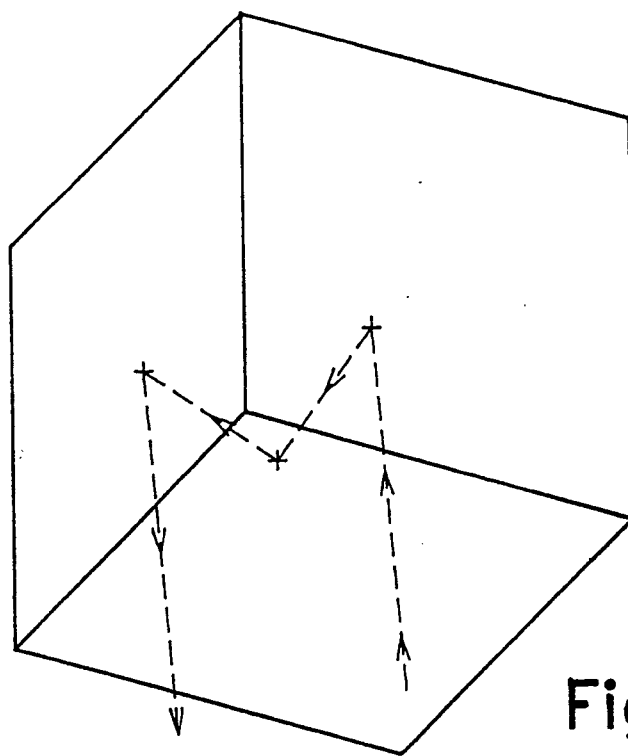
FIG. 5 is a perspective view of an individual retroreflective cell showing reflection at all three surfaces of the cell.

FIG. 5 shows a single cell of the retroreflector having an inside cube array of cells with dashed lines indicating the way a ray of light returns along a path parallel and close to an incident path. Because the sides of each face are typically about a millimeter across, and because the refracted angle at the exterior surface 24 of the retroreflector will be equal to, but in the opposite direction of, the refractive angle of the entering light; and because at incident angles less than about 45 degrees with the normal of the exterior surface, almost all of the light is refracted, rather than reflected, at the exterior surface; light entering the retroreflector will be returned to its source when the incident angle is less than about 45 degrees with the normal. At angles greater than about 45 degrees to the normal of the retroreflector surface, some of the light hitting the retroreflector is reflected at the exterior surface and is not returned to the source, while the remainder of the light is reflected back to the source as previously described. Both of these possibilities are illustrated in FIG. 4, which shows a light ray 36 having an incident angle greater than 45 degrees, which is partially reflected at the surface along ray 38 and partially refracted at the surface, then reflected at the retroreflector surface, and finally refracted again at the surface to provide a ray 40 which is parallel to the incident light ray 36. Light ray 42, having an incident angle less than 45 degrees, is completely refracted at the external surface, then reflected at the retroreflective surface, and finally refracted along a ray 44 which is parallel to the incident ray 42.

FIG. 2 illustrates a preferred embodiment of the invention. The housing, power supply, and wiring are a matter of choice, and have been omitted. A retroreflector 20, which is approximately 1/16-inch thick and approximately 3 inches in diameter, has a retroreflective back surface 22 comprised of a repeating pattern of inside cube shapes. Four light-emitting diodes 12 (only two are shown) are embedded in the retroreflector 20 and are within the plane of the retroreflective surface 22. The retroreflective 20 is fused and/or fixed with adhesives along the inner surface of the flange portion 29 to the housing 30. The Hewlett-Packard HLMP light-emitting diode, for example, is suitable for use in the invention. The four light-emitting diodes are arranged in a square pattern, with the center of the square coinciding with the center of the illuminated surface. Each light-emitting diode is positioned slightly closer to the edge than to the center of the illuminated surface. With this particular embodiment, light is emitted from the entire surface 24 to provide a relatively brilliant night-timer marker.

In FIG. 3, an alternative embodiment of the invention, including a lens member, such as a collimating lens or a Fresnel lens.

The most essential feature of the invention is that the light-generating means is mounted within, or immediately in front of, the optical material of the retroreflector, thereby effectively dispersing light through the material by partial internal reflection from the plastic air interfaces, which causes the light to be emitted from the entire surface 24 of the retroreflector. It has been discovered that the invention, using only the lower power of the light-emitting diodes, spreads light over a relatively wide surface of a reflector, thereby promoting visibility at great distances and at varied angles. If the lamp is mounted immediately in front of the retroreflector rather than within its optical plane, the light dispersal effect is still seen, but not as intensely.

It has been found that by mounting or embedding the light-generating means within the optical material of the retroreflector, the illuminated surface 24 is highly visible outdoors, at night at distances of up to half-mile. It remains highly visible irrespective of the viewing angle up to an angle approaching 90 degrees with respect to a plane perpendicular to the illuminated surface.

The lighting system this provides the lighting power of the light-emitting diodes, but with the light spread over a wider apparent surface than the lamps themselves are capable of, thus promoting the visibility of the system at a distance. The retroreflector's properties are themselves diminished only slightly by the addition of the light-emitting diodes within the retroreflector. The lighting system is thus seen very brightly under conditions of both darkness and oncoming illumination, while most ordinary light are overwhelmed by oncoming illumination and provide no special visible effect to a driver. If the color of the lamp and the retroreflective disc are similar, the light generated by the lamps and the appearance of the unit will be seen as a continuum of bright light by the driver of an oncoming automobile.

When light-emitting diodes are used as the light source, only a very small amount of total power is required to provide adequate illumination. It has been found that four light-emitting diodes running at 35 mw each from a 9-volt transistor radio battery provides sufficient illumination to meet the legal requirements for bicycle tail lights in most states (such as in Ohio, which requires a 500-foot visibility).

Other uses of such a lighting system might include: safety illumination of a car parked along a dark road; illumination of driveway ends; illumination of recreational vehicles parked in dark places; markers for fire extinguishers and other safety devices which might be searched for either with or without searchlights and flashlights illumination of boats, aircraft, and the like. The lighting system may be made either flashing or nonflashing for its active mode.

A particular advantage of using such a device in a parked car or other setting in which illumination might be required for a long period of time is that adequate light may be obtained with very little power, and therefore very low electrical drain on a battery or other electrical source. A light using four light-emitting diodes would load an automobile's battery so lightly that there might be no need to supply an ON/OFF switch; the unit could be left on continuously without significantly draining the vehicle's battery.

A lens 50 may be employed as an option to selectively direct or amplify the light beam generated by the light-emitting diodes 12 or other light-generating means. For example, a collimating lens or Fresnel lens could be used to direct light from the light generating means without disturbing the retroreflective property of the back surface. Depending on the type and number of light-emitting diodes or other light-generating means used, and on the power source selected, a resistor may be desired to limit the current flow.

Manufacturing techniques suitable for this device include a technique of mounting the light-emitting diodes in front of the retroreflective disc with the leads sticking through to the back, then pouring liquid plastic over the surface to provide an optical path contiguous with both the molded retroreflective surface in back and the light-emitting diode surfaces in front. A very inexpensive way to make the device might be to mold unencapulsated light-emitting diodes junctions into a retroreflective unit using the same plastics and molding techniques now used to produce encapsulated light-emitting diodes. The wire leads from the light-emitting diodes can be molded along with a ballast resistor directly into the retroreflective disc leaving only two wires emerging from the molding, ready to be connected directly to a power source.

While the invention has been shown and described with respect to a particular embodiment thereof, this is for the purpose of illustration rather than limitation, and other variations and modifications of the specific embodiment herein shown and described will be apparent to those skilled in the art, all within the intended spirit and scope of the invention. Accordingly, the patent is not to be limited in scope and effect to the specific embodiment herein shown and described nor in any way that is inconsistent with the extent to which the progress in the art has been advanced by the invention.

What is claimed is:

1. A self-illuminated reflector system, comprising;
   a retroreflector having a retroreflective back surface with reflector/air interfaces;
   light-generating means embedded in said retroreflector such that the origin of light emanating from said light-generating means is positioned substantially in said retroreflective back surface, whereby said light is dispersed by partial internal reflection from the reflector/air interfaces causing light to be emitted over the retroreflective surface, thus making the reflector visible at long distances without other light shining on it; and
   means for providing electrical power to said light-generating means.

2. A self-illuminated retroreflector according to claim 1, wherein said transparent material is a molded plastic having a high refractive index.

3. A self-illuminated reflector system according to claim 1, wherein said light-generating means includes a light-emitting diode.

4. A self-illuminated reflector system according to claim 1, including a lens member disposed over said light-generating means for directing the light generated by said light-generating means to improve the visibility of said self-illuminated reflector system.

5. A self-illuminated reflector system according to claim 4, wherein said lens member is a collimating lens.

6. A self-illuminated reflector system according to claim 4, wherein said lens member is a Fresnel lens.

7. A self-illuminated reflector system according to claim 1, wherein said means for providing electrical power to said light-generating means includes at least one battery.

8. A self-illuminated reflector system according to claim 3, having a plurality of light-emitting diodes mounted substantially in said retroreflective surface.

9. A self-illuminated reflector system according to claim 8, wherein said light-generating means are 20 milliamp high intensity light-emitting diodes.

10. A self-illuminated reflector system according to claim 3, wherein said reflector is a molded plastic disk which is approximately three inches in diameter, having four of said light-emitting diodes embedded in said retroreflective surface.

11. A self-illuminated reflector system according to claim 1, wherein said retroreflective surface comprises a multiplicity of cube-corner reflector elements having three mutually perpendicular planes, whereby light impinging on said surface is reflected back along the same path it was incident from or along another path parallel and close to the incident path.

12. A self-illuminated reflector system, comprising;
    a retroreflector having a retroreflective back surface;
    light-generating means embedded in said retroreflector such that the origin of light emanating from said light-generating means is positioned near the front of said retroreflective surface, whereby said light is dispersed by partial internal reflection from reflector/air interfaces causing light to be emitted over the retroreflective surface, thus making the reflector visible at long distances without other light shining on it; and
    means for providing electrical power to said light-generating means.

13. A self-illuminated reflector system ; comprising:
    a retroreflector having a retroreflective back surface, wherein said retroreflective back surface comprises a multiplicity of cube-corner reflector elements having three mutually perpendicular planes, whereby light impinging on said surface is reflected back along the same pat h it was incident from or along another path parallel and close to the incident path;
    a plurality o flight-emitting diodes embedded in said retroreflector such that the origin of light emanating from said light-emitting diodes is positioned substantially in said retroreflective back surface, whereby said light is dispersed by partial internal reflection from retroreflector/air interfaces causing light to be emitted over the retroreflective surface, thus making the reflector visible at long distances without other light shining on it;
    a lens member disposed over said light-emitting diode directing the light generating by said light-emitting diode to improve the visibility of said combination safety light and reflector system;
    at least one battery for powering said light-emitting diodes; and
    a resistor or other means to limit current flow.

* * * * *